US006972947B2

(12) United States Patent
Duncan

(10) Patent No.: US 6,972,947 B2
(45) Date of Patent: Dec. 6, 2005

(54) LAPTOP COMPUTER WITH ELEVATING DISPLAY

(76) Inventor: Robert R. Duncan, P.O. Box 190746, Anchorage, AK (US) 99519-0746

( * ) Notice: Subject to any disclaimer, the term of this patent is extended or adjusted under 35 U.S.C. 154(b) by 97 days.

(21) Appl. No.: 10/640,945

(22) Filed: Aug. 13, 2003

(65) Prior Publication Data

US 2005/0036281 A1 Feb. 17, 2005

(51) Int. Cl.[7] .................................................. G06F 1/16
(52) U.S. Cl. ....................................... 361/683; 361/681
(58) Field of Search ................................ 361/679–681, 361/683, 686

(56) References Cited

U.S. PATENT DOCUMENTS

| | | | | |
|---|---|---|---|---|
| D294,262 S | | 2/1988 | Thies et al. | D14/113 |
| D337,104 S | | 7/1993 | Orchard | D14/113 |
| 5,255,214 A | | 10/1993 | Ma | 364/708.1 |
| 6,005,767 A | | 12/1999 | Ku et al. | 361/681 |
| 6,266,236 B1 | * | 7/2001 | Ku et al. | 361/681 |
| 6,392,871 B1 | | 5/2002 | Yanase | 361/681 |

* cited by examiner

*Primary Examiner*—Yean-Hsi Chang
(74) *Attorney, Agent, or Firm*—Dean A. Craine

(57) ABSTRACT

A laptop computer including a display securely attached by one or more swing arms, pivotally mounted at their opposite ends to the laptop body and the display, which allows the display to be manually elevated and rotated forward to a position over the keyboard of the computer. The swing arms are sufficient in length to allow the display to be positioned along the rear edge of the computer for normal viewing or rotated and elevated forward or upward for close-up viewing in tight viewing situations. The invention is ideal for near sighted individuals and for use in tight, restricted locations, such as an airplane seat, because the monitor can be moved upward and forward so the display screen is closer to the user and he or she can still adequately type.

6 Claims, 4 Drawing Sheets

80
82
90
92
84
80
82
90
92
84
80
82
10
84
80
82

30'
12
18
80
81
79
77
60
69
70
79
30
67
77
31
71
72
60
75
50
56
30
56
55
57
55

LAPTOP COMPUTER WITH ELEVATING DISPLAY

BACKGROUND OF THE INVENTION

1. Field of the Invention

This invention pertains to laptop computers and more particularly to laptop computers with adjustable displays.

2. Description of the Related Art

A laptop computer is designed and developed to meet the needs of portability while still maintaining productivity. Most laptop computers have an attached display pivotally attached along the rear edge of the laptop body. During use, the display is tilted at different angles over the body for optimal viewing.

Typically, the user sits 10 to 18 inches behind the laptop so that his or her hands are comfortably positioned over the keyboard for optimal typing. The laptop body is horizontally aligned and the display is slightly tilted rearward so that the user looks slightly downward towards the center of the display.

Because laptop computers are portable, they are often used in environments with limited space that prevents the laptop body from being positioned at a distance for optimal typing or touch pad control. Also because the displays are typically LCD monitors, the limited space prevents the user from tilting the display at a suitable angle for viewing. A commonly known environment with limited space is "coach seating" in an aircraft where it is desirable to lower the food tray located on the seat immediately in front of the passenger and then place the laptop body on the food tray. When the back of the front seat is reclined, the food tray is positioned closer to the user thereby reducing the distance between the user and the keyboard. With current laptop designs with the display pivotally attached along the rear edge of the laptop body, it is impossible to tilt the display rearward for optimal viewing (see FIG. 2). As a result, most users of laptop computers traveling in "coach seating" on an aircraft, do not use a laptop computer.

SUMMARY OF THE INVENTION

It is an object of the present invention to provide a laptop computer with a pivoting display.

It is another object of the present invention to provide such a laptop computer that allows the display to be elevated and rotated over the keyboard so that the display may be viewed in tight, restricted spaces.

It is another object of the present invention to provide such a laptop computer that allows comfortable use of the keyboard when the display is elevated and rotated over the keyboard.

It is a further object of the present invention to provide a laptop computer that includes a touch screen function and allows the display to be stacked in a 'face-up' position over the laptop body.

These and other objects are met by a laptop computer presented herein that includes a laptop body with a pivoting display that may be re-positioned in a diagonally aligned position over the rear or front edges of the laptop body or in a parallel or stacked position over the laptop body. The laptop computer includes two swing arms pivotally mounted at their opposite ends to the opposite sides of the laptop body and the opposite sides of the display. During use, the swing arms pivot over the sides of the laptop body between a rearward and a forward extended position on the laptop body. Locking means are provided on the ends of the swing arms to lock the swing arms and the display in a fixed position During use, the swing arms are extended rearward to position the display adjacent to the rear edge of the laptop body like a standard laptop computer. When positioned in this location, the display may pivot on the ends of the swing arms so that it may be placed in an optimal viewing angle for the user. When used in an environment that prevents the display from being place in an optimal viewing angle, the two swing arms may be rotated upward and forward thereby elevating and re-position the lower edge of the display over the keyboard and near the front edge of the laptop body. The swing arms are sufficient in length so that sufficient space is provided for the user's fingers to operate the keyboard when the display is rotated in a forward, elevated position.

In one embodiment, the display includes a touch screen function that allows the user to input data into the laptop body via the display when then display is rotated rearward into a stacked, 'face-up' position over the laptop body.

DESCRIPTION OF THE PREFERRED EMBODIMENT(S)

Figure 2:
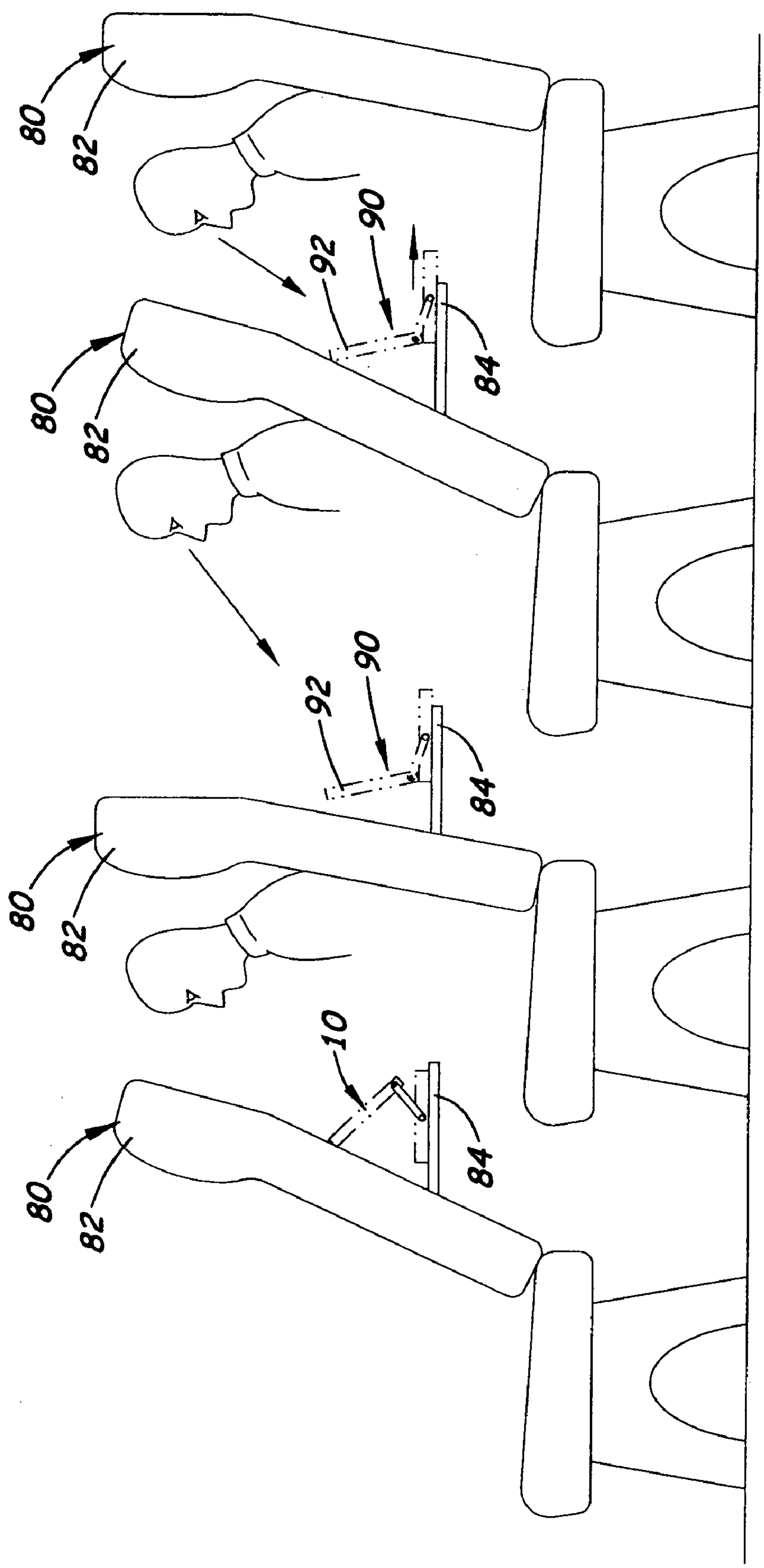
FIG. 2 is a side elevational view of four rows of seating on an aircraft showing the relative space between rows and the amount of space available for using a standard laptop and the laptop computer disclosed herein.

There is shown in FIG. 2 a side elevational view of several rows of seating in the "coach section" on a passenger airplane. Sitting on the last two rows are individuals trying to use standard laptop computers 90, 90' on folding food trays 84, 84, respectively. For both users, the laptop computers 90 are shown positioned towards the user in order to view their displays, 92, 92'. Unfortunately, neither user is able to position the displays at an optimal viewing angle.

The laptop computer 10 disclosed herein is designed to address the problems associated with using a laptop computer in a restricted area. As more clearly shown in FIGS. 1, 3–5, the laptop computer 10 includes a standard computer laptop body 12 with built-in keyboard 14. Attached to the sides 16, 18 of the body 12 are two swing arms 40, 60 pivotally mounted at their proximal ends 42, 62, respectively near the laptop body's transverse midline axis 24. The opposite distal ends 44, 64 of the swing arms 40, 60 are attached to the right and left sides 32, 34, respectively, of the display 30.

Figure 3:
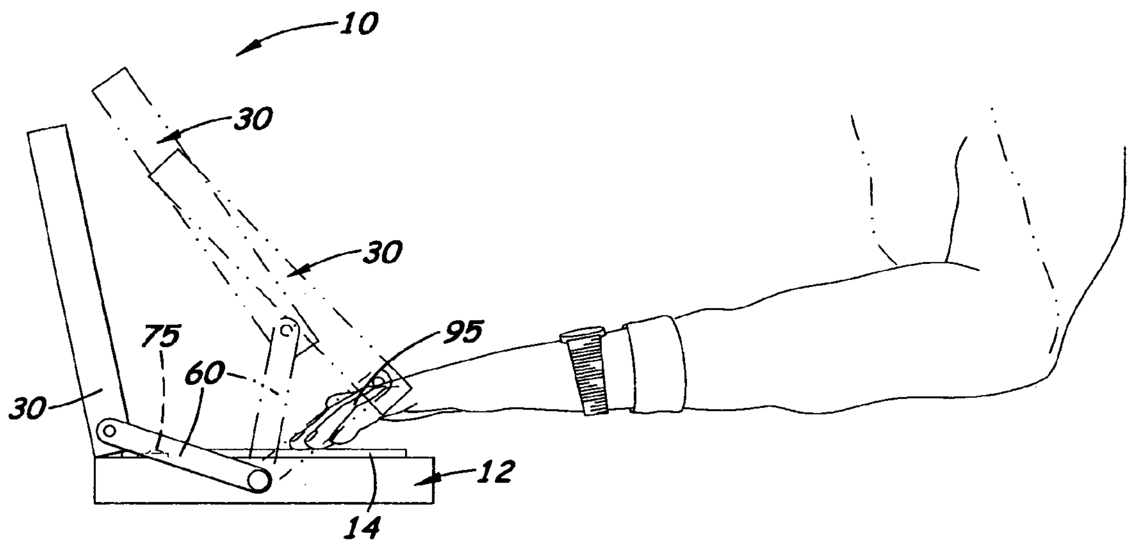
FIG. 3 is a side elevational view of the laptop computer shown in FIG. 1 showing the movement of the arms and the display being rotated forward and elevated over the keyboard.
Figure 5:
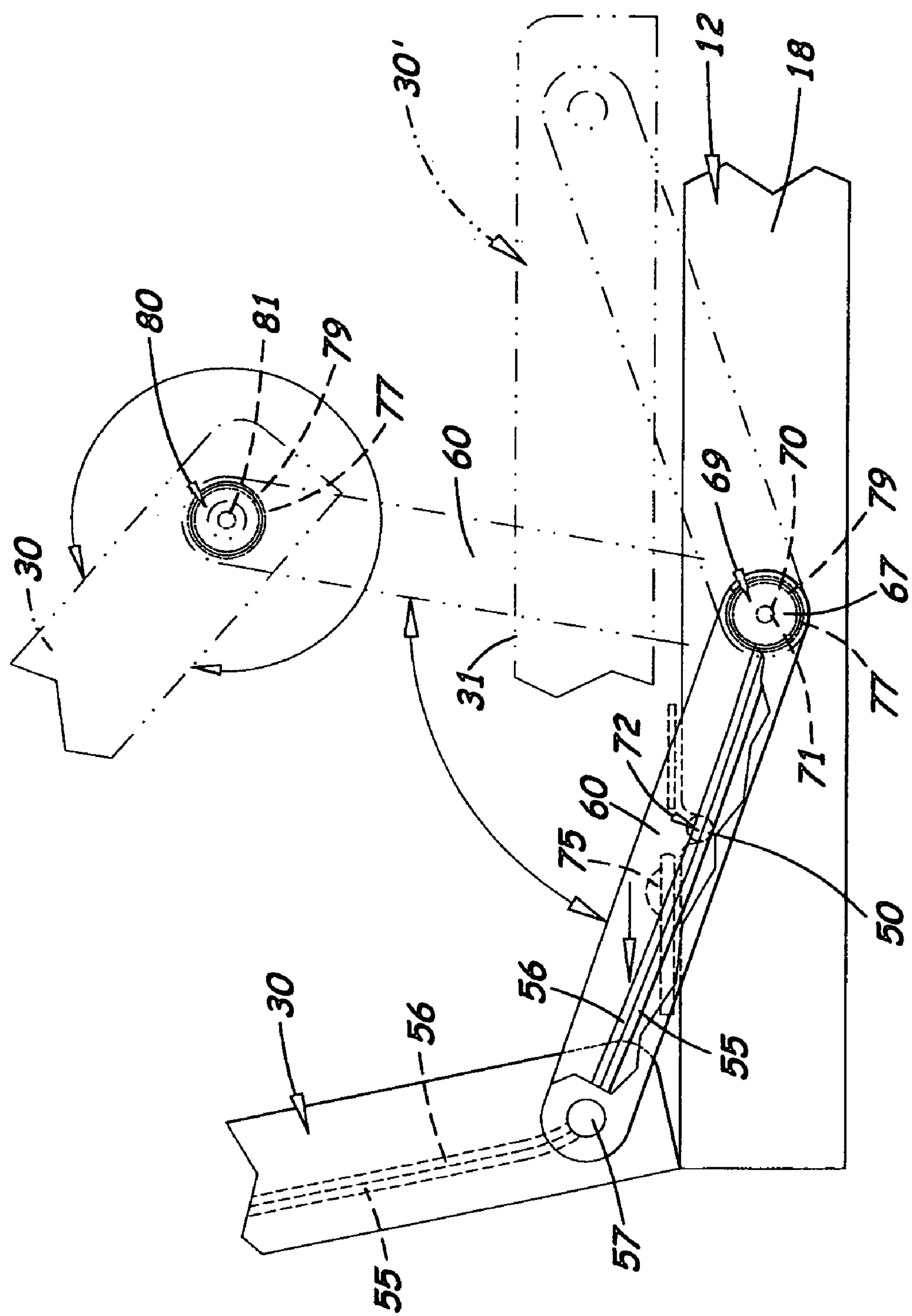
FIG. 5 is a side elevational view of an arm mounted on the side of the laptop body showing the relative movement of the arms and the display.

During use, swing arms 40, 60 are designed to selectively rotate rearward and forward on the sides 16, 18 of the body 12. The swing arms 40, 60 are sufficient in length so that the lower edge 35 of the display 30 is positioned above the rear edge of the body 12 when the swing arms 40, 60 are aligned rearward as shown in FIGS. 3 and 5. The swing arms 40 and 60 are also sufficient in length to allow the user to position his or her fingers 95 over the individual keys 15 of the keyboard 14 when the swing arms 40, 60 are rotated forward as shown in FIG. 3. The distal ends 44, 64 of the swing arms 40, 60, respectively, are also pivotally mounted on the right and left sides 32, 34 of the display 30 via laterally extending pins 45, 47 so that the user may selectively adjust the position of the display 30 relative to the swing arms 40, 60. Wires 55 and 56 extend through at least one swing arm 40 or 60 to electrically connect the display 30 to the laptop body 12.

Figure 4:
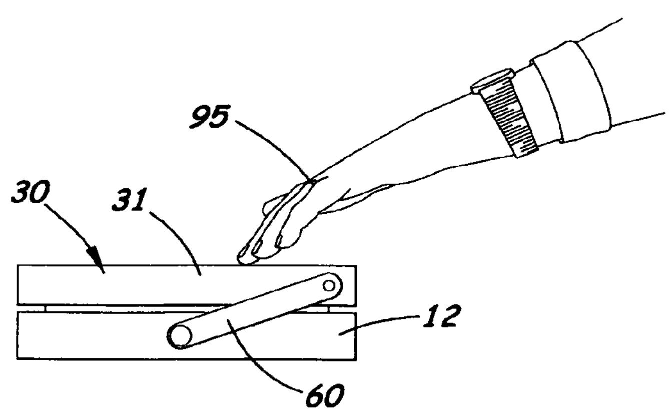
FIG. 4 is a side elevational view of a second embodiment of the laptop computer showing the display placed longitudinally over the keyboard.

In a second embodiment of the invention shown in FIGS. 4 and 5, the laptop computer 10 may include a display 30' that uses a touch screen 31 for inputting data into the laptop body 12. During use, the swing arms 40, 60 may be rotated forward and the display 30' rotated rearward into a stacked arrangement over the laptop body 12 so that the laptop computer 10 may be used as a "tablet" computer.

An optional locking means for locking the swing arms 40 and 60 in a desired position over the laptop body 12 is also provided. In the preferred embodiment, the locking means includes a rod 50 that extends longitudinally over the laptop body 12 and between the two swing arms 40, 60. The opposite ends of the rod 50 are securely attached to the swing arms 40, 60 at locations slightly below the lower edge 35 of the display 30 or 30'. As shown in FIG. 5, formed on the top surface of the laptop body 12 is a longitudinally aligned slot 72 designed to receive the rod 50 when the swings arms 40, 60 are rearward aligned. In the preferred embodiment, at least one slide latch 75 is mounted on the top surface of the laptop body 12 which is moved forward to selectively lock the display 30 is a rearward position over the laptop body 12. During use, the slide latch 75 is moved rearward over the top surface to restrain the rod 50 inside the slot 72. When the latch 75 is moved rearward, the swing arms 40, 60 are able to rotate forward and upward to reposition the display 30 or 30' over the body 12.

Located at the proximal ends 42, 62 of the swing arms 40, 60 are optional adjustment knobs 66, 69 that the user selectively tightens to lock and unlock the proximal ends 42, 62 of the swing arms 40, 60, respectively, to the laptop body 12. As shown in FIG. 5, each adjustment knob 66, 69 (adjustment knob 69 shown only) includes a threaded post 70 that connects to a threaded bore 71 formed on the sides (side 18 shown only) of the laptop body 12. During assembly, the post 70 extends through a non-threaded bore (not shown) formed on the swing arms 40, 60 and into the threaded bore 71 to selectively connect the swing arm 40, 60 to the laptop body 12. Suitable flat washers 77 and lock washers 79 are used to improve operation.

In the preferred embodiment, a pair of laterally extending pins 57, 58 (pin 57 shown only in FIG. 5) are attached to the sides of the display 30. During assembly, the distal ends 44, 64 of the swing arms 40, 60 connect to the pins 57, 58. In the preferred embodiment, the friction forces between the pins 57, 58 and swing arms 40, 60, respectively, are sufficient to hold the display 30 in a fixed position. In an alternative embodiment, also shown in FIG. 5, the pins 57, 58 are replaced with a pair of adjustment knobs 80 that are identical to adjustment knobs 66 and 69 and threaded bores 81, to selectively tighten the display 30 or 30' on the distal ends of the swing arms 40, 60.

Figure 1:
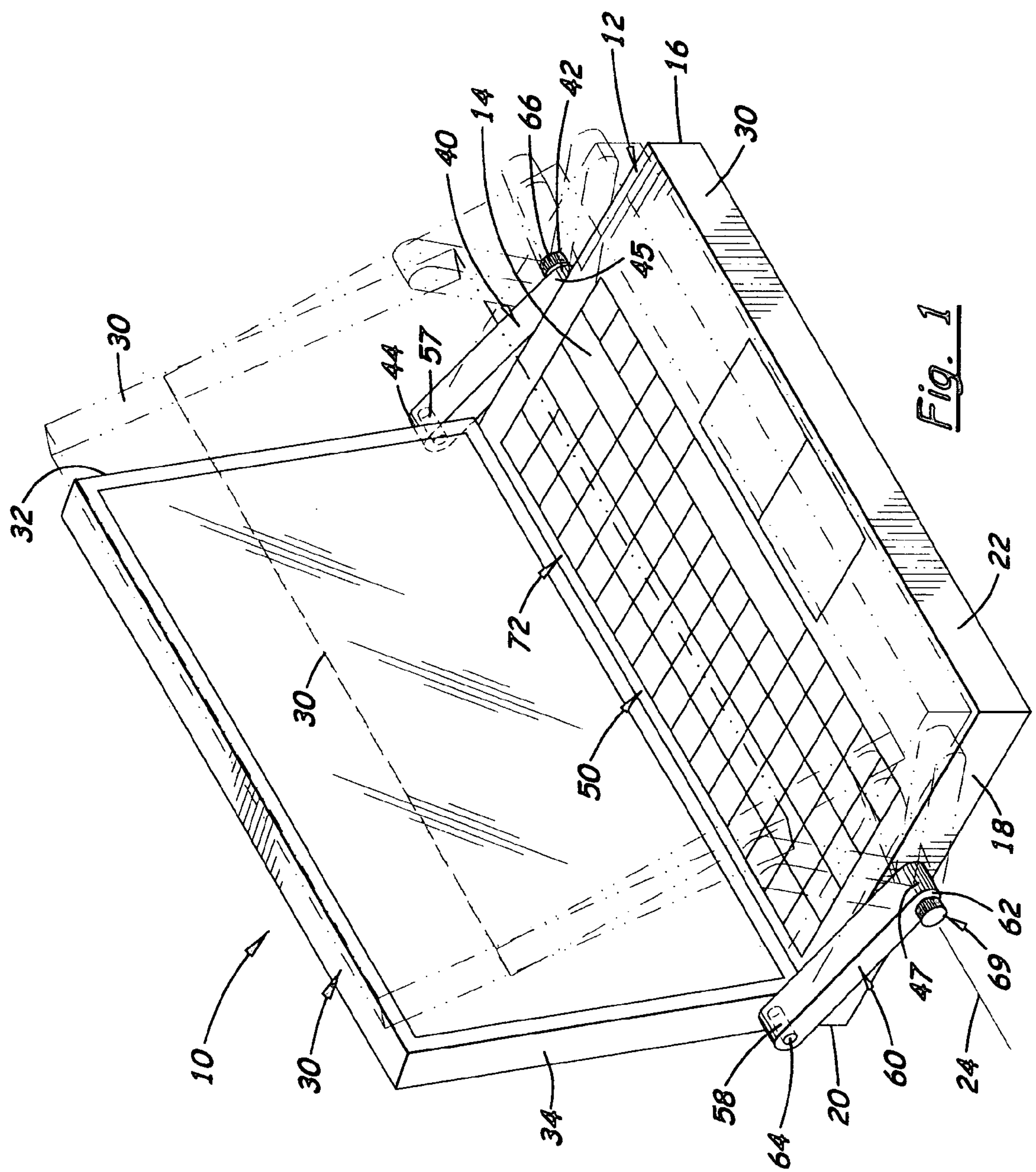
FIG. 1 is a perspective view of the space saving laptop computer with a pivoting display.

In the preferred embodiment, the laptop body 12 is approximately 11 inches in width and 12 inches in length. The swing arms 40, 60 are approximately 6 inches in length, and are made of hollow aluminum or steel tubing so that wires may extend from the laptop body 12 to the display 30. When the swing arms 40, 60 are rotated to a forward position, as shown in FIGS. 1 and 3, the space between the lower edge 35 of the display 30 and the keyboard 14 is approximately 3 inches.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A laptop computer, comprising:

a. laptop body with a keyboard mounted thereon, said laptop body including two opposite sides, a top surface, a front surface, a rear surface, and a mid-line transverse axis;

b. a display electrically connected to said laptop body, said display having opposite sides;

c. two swing arms, each said swing arm being pivoting connected at one end to said opposite sides of said laptop body near said transverse axis and being pivotally connected at an opposite end to the opposite said sides of said display, said swing arms being sufficient in length so that when said swing arms are rotated in a rearward direction said display may be positioned adjacent to said rear surface and when said swing arms are rotated in forward direction said display is position over said keyboard, thereby enabling a user to simultaneously view said display and comfortably use said keyboard when said display into either positions, and;

d. means for locking said swing arms in a fixed position on said sides of said laptop body.

2. The laptop computer, as recited in claim 1, wherein said means for locking said swing arms in a fixed position is a rod disposed between said side swing arms, a slot formed on said top surface of said laptop body, and at least one latch attached to said laptop body, capable of engaging said rod when disposed inside said slot, said slot being located on said top surface of said laptop body so that said rod is disposed inside said slot when said swing arms are rotated rearward and said latch may be activated to restrain said rod into said slot to lock said swing arms in position over said laptop.

3. The laptop computer, as recited in claim 2, further including means to adjustably lock said swing arms on said laptop body.

4. The laptop computer, as recited in claim 3, further including means for selectively locking said swing arms to said display.

5. The laptop computer, as recited in claim 1, further including means to adjustably lock said swing arms on said laptop body.

6. The laptop computer, as recited in claim 1, further including means for selectively locking said swing arms to said display.

* * * * *